United States Patent [19]
DeVries et al.

[11] Patent Number: 4,720,648
[45] Date of Patent: Jan. 19, 1988

[54] PROTECTIVE COVER FOR SLOTTED MOTOR HOUSING SHELL STRUCTURE

[75] Inventors: Wayne J. DeVries, Fenton; Roy C. Eliason, Chesterfield, both of Mo.

[73] Assignee: Emerson Electric Co., St. Louis, Mo.

[21] Appl. No.: 833,831

[22] Filed: Feb. 28, 1986

[51] Int. Cl.⁴ ............................................. H02K 5/10
[52] U.S. Cl. ........................................ 310/89; 29/428
[58] Field of Search ............. 29/156.4 R, 428, 526 R; 310/40 MM, 42, 62, 63, 85, 88, 89, 91, 157

[56] References Cited

U.S. PATENT DOCUMENTS

| | | | |
|---|---|---|---|
| 1,273,981 | 7/1918 | Adams | 310/91 |
| 2,347,517 | 4/1944 | Smalley | 310/63 |
| 2,588,156 | 3/1952 | Ogilvy | 310/91 |
| 2,967,959 | 1/1961 | Waters | 310/63 |
| 3,021,442 | 2/1962 | Rodak | 310/89 |
| 4,033,531 | 7/1977 | Levine | 310/91 |
| 4,103,192 | 7/1978 | Wendt et al. | 310/91 |
| 4,593,163 | 6/1986 | Fisher | 200/80 R |

FOREIGN PATENT DOCUMENTS

| | | | |
|---|---|---|---|
| 512647 | 4/1955 | Canada | 310/89 |

Primary Examiner—Patrick R. Salce
Assistant Examiner—D. L. Rebsch
Attorney, Agent, or Firm—Polster, Polster and Lucchesi

[57] ABSTRACT

An improved housing structure for an outer motor housing shell having slots for ventilating purposes, including a protective cover detachably fastenable to the outer face of the housing shell, the cover having a depending skirt sized and contoured to extend spacedly opposite the slots to protect the motor from falling rain, and yet permit proper ventilation.

2 Claims, 6 Drawing Figures

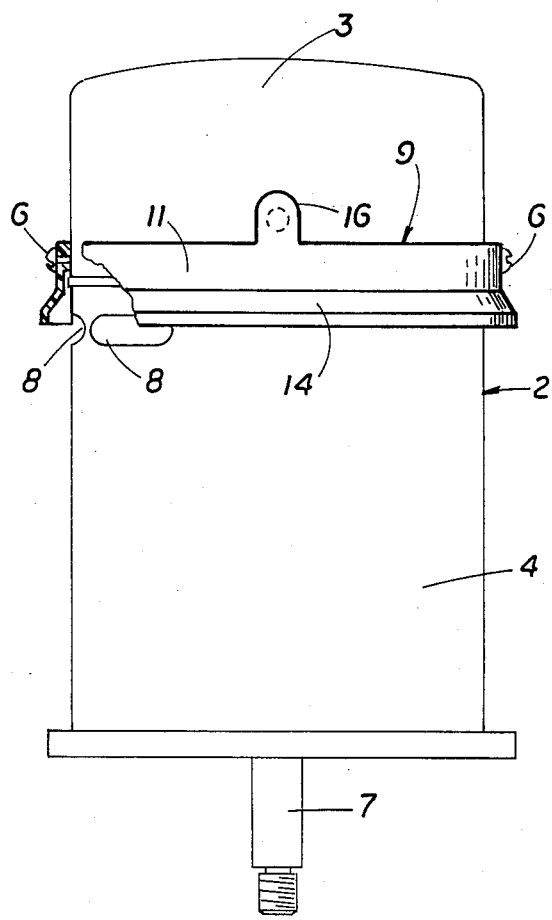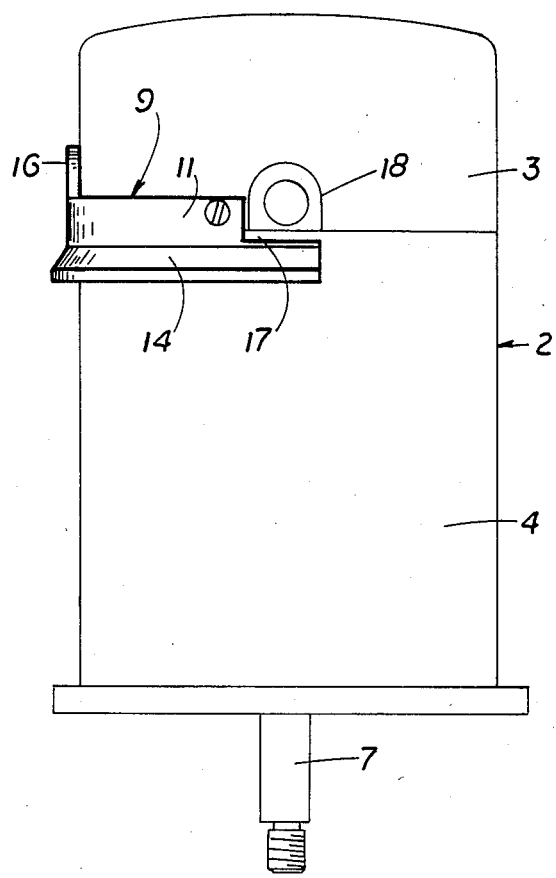
FIG. 1  FIG. 2
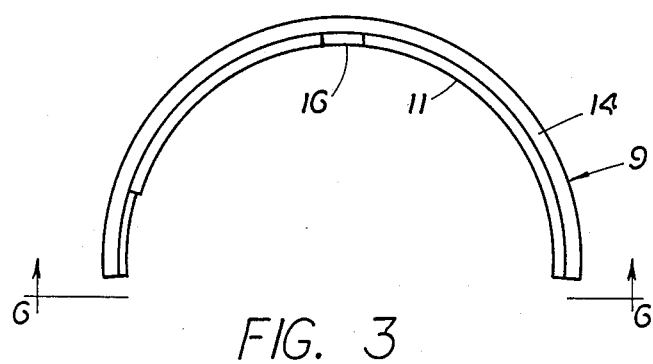
FIG. 3
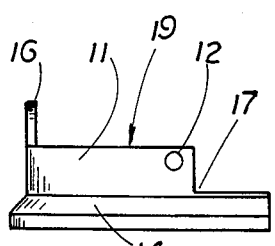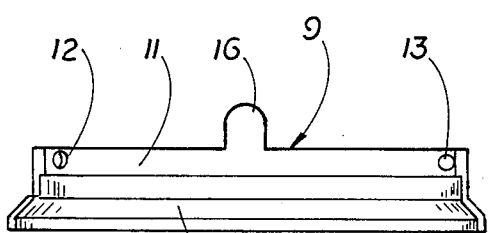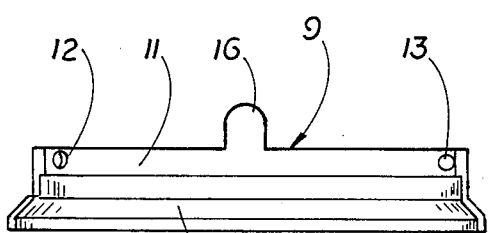
FIG. 4  FIG. 6  FIG. 5

PROTECTIVE COVER FOR SLOTTED MOTOR HOUSING SHELL STRUCTURE

BACKGROUND OF THE INVENTION

The present invention relates to motor housing structure and more particularly to an improved structure which serves to protect motor parts disposed within a housing from falling rain and yet, at the same time, allows ready ventilation to such motor parts.

In many types of motor housings, it is desirable to provide vent slots therein at appropriate locations to insure proper ventilation of the several parts of the motor during normal motor operations. At the same time, it is desirable to protect the motor components from contaminants such as dirt, dust, insects, vermin and moisture, often in the form of rainfall. Although motor housings frequently can be mounted or disposed to shield and protect ventilating slots from contaminating elements—for example, by mounting a motor housing with the longitudinal axis of the housing in a horizontal position and with the slots facing downwardly—such selective mounting is not always permissible and often it is a space or engineering requirement that the motor housing be disposed with the longitudinal axis thereof in a vertical position.

The present invention, recognizing these structural limitations and requirements of the past, as well as the almost ever present need to provide appropriate moisture protection and ventilation of the several motor components, provides a straightforward and economical structural arrangement which permits both protection and ventilation of the motor components disposed within a housing shell regardless of shell orientation. In addition, the structural arrangement of the present invention lends itself to efficient and economical manufacture and assembly, being readily adaptable for the retrofiting of existing installations which are in need of motor component protection from the elements.

Various other features of the present invention will become obvious to one skilled in the art upon reading the disclosure set forth herein.

SUMMARY OF THE INVENTION

More particularly, the present invention provides an improved housing structure for a motor assembly comprising: an outer motor housing shell having slot means disposed therein for ventilating purposes; a detachable protective cover means sized to snugly engage the outer face of the shell adjacent the slot means, the cover means including an outwardly depending skirt portion adapted to extend spacedly opposite the slot means to protect the motor disposed in the housing from contaminant elements such as rain and to permit motor ventilation; and fastening means to detachably secure the cover means in place on the motor housing shell.

It is to be understood that various changes can be made by one skilled in the art in the arrangement, form and construction of the apparatus disclosed herein without departing from the scope or spirit of the present invention.

BRIEF DESCRIPTION OF THE DRAWING

Referring to the drawing which discloses an advantageous embodiment of the present invention:

FIG. 1 is a front elevational view of an assembled, vertically disposed motor housing shell and protective cover, the cover being slightly broken away;

FIG. 2 is a side elevational view of the motor housing shell and protective cover of FIG. 1;

FIG. 3 is a top view of the protective cover of FIGS. 1 and 2;

FIG. 4 is an outer side view of one side portion of the protective cover of FIG. 3;

FIG. 5 is an outer side view of another side portion of the protective cover of FIG. 3; and, FIG. 6 is an inner view of the protective cover of FIG. 3 taken in a plane in the direction of the arrows 6—6 in FIG. 3.

DETAILED DESCRIPTION OF THE INVENTION

Referring to the several figures of the drawing, the inventive housing for an outer motor housing shell, particularly for a motor arrangement to be disposed in a vertical position, is broadly disclosed by reference numeral 2 and includes upper cylindrical shell section 3 and lower cylindrical shell section 4. With the motor components properly disposed within the shell sections through the open ends thereof, the open ends are placed in mirror image position and the sections are joined together to form vertical housing 2. In this regard, the sections can be so sized at their open ends to snugly overlap and are provided with correspondingly spaced screw receiving apertures to receive screws 6 to be fastened together. Since the motor components do not, per se, form an essential part of the inventive housing structure, they are not disclosed in detail herein and only shaft 7 projecting from housing 2 is disclosed.

As will be noted in FIG. 1, the lower cylindrical shell section 4 is provided with suitable ventilating slots 8 at the upper end adjacent the overlapping sections along one side thereof to permit circulation of ventilating air in housing 2. To prevent falling rain and other contaminants from entering into housing 2 through slots 8, a detachable protective cover 9 is provided in accordance with the present invention.

As can be seen in FIGS. 3-6, protective cover 9 includes a semi-cylindrical band portion 11 sized to snugly engage the outer face of vertical housing shell 2, the band portion 11 enhancing the rigidity of housing shell 2. Referring to FIGS. 4 to 6, band portion 11 can be seen to include spaced apertures 12 and 13 which are aligned to correspond with the aforedescribed screw receiving apertures on the upper and lower cylindrical shell sections 3 and 4 respectively which sections form housing shell 2. Thus, protective cover 9 can be fastened with the same screws 6 that are used to fasten the joined end-to-end sections of housing 2. It is to be noted that aperture 13 is elongated to accommodate for tolerance variations between the protective cover and shell. Advantageously, it is desirable that protective cover 9, which can be formed from any one of a number of suitable plastic materials, have sufficient flexibility to permit appropriate flexing for aperture alignment in the event such tolerance variations occur.

As can also be seen in the several figures of the drawing, protective cover 9 includes a depending skirt portion 14 integral with and extending outwardly from band portion 11 at an approximately 45 degree angle from the plane determining the outer face of band portion 11 and, of course, the longitudinal axis of the shell housing 2 when the protective cover 9 is fastened to the housing 2. It is to be understood that other angles of extension can be utilized, if so desired, depending upon the ambient conditions in which the motor is to be used and the ventilation results desired. It also is to be noted that skirt portion 14 is of sufficient width to prevent rain falling at an angle of as much as 45 degrees from passing through the ventilating slots 8 in lower cylindrical section 8, the width of skirt portion 14 depending upon the location of the ventilating slots 8 and the other parameters aforementioned.

As also will be noted in the drawing, band portion 11 of protective cover 9 in addition to adding to the overall rigidity of housing 2 and including depending skirt portion 14, can further include tab members such as tab member 16 selectively extending therefrom in the same plane to cover non-ventilating holes in housing shell 2 which holes are often required for motor assembly and adjustment. Further, band portion 11 can be suitably broken away in its formation as at 17 to accommodate for any outer shell protrusions as at 18 in FIG. 2.

Thus, from the above description it can be seen that the present invention provides an improved housing structure for a motor which can be readily and efficiently manufactured and assembled with a minimum of operative steps and parts, insuring both motor protection and ventilation.

The invention claimed is:

1. An improved housing structure for a motor assembly comprising: a vertically disposed cylindrical outer motor shell having opposed upper and lower end-to-end cylindrical sections sized to snugly overlap into contacting relation at their opposed facing ends and be joined through aligned spaced fastener receiving apertures in said overlapping opposed facing and contacting ends and corresponding fastener extending therethrough; the lower of said cylindrical sections including ventilating slot means adjacent said overlapping sections along one side thereof; a detachable protective cover means including a semi-cylindrical band portion sized to snugly engage the outer face of said shell, said band portion including spaced apertures aligned to correspond with said aligned fastener receiving apertures of said overlapping opposed facing and contacting ends of said housing shell to be fastenable to said housing shell by said fasteners for said joined sections, at least one of said apertures in said band portion being elongated to accommodate for tolerance variations between said cover means and said housing shell; said cover means further including a depending skirt portion integral with and extending downwardly and outwardly from said band portion at an approximately 45° angle from the longitudinal axis of said housing shell when fastened thereto and having a sufficient width, so that said cover means prevents rain falling at a 45° angle from passing through said contacting ends and said ventilating slot means in said lower housing section.

2. The protective cover structure of claim 1, said cover means being of a sufficiently flexible plastic material to allow for tolerance adjustments.

* * * * *

UNITED STATES PATENT AND TRADEMARK OFFICE
CERTIFICATE OF CORRECTION

PATENT NO. : 4,720,648

DATED : January 19, 1988

INVENTOR(S) : DeVries et al

It is certified that error appears in the above—identified patent and that said Letters Patent is hereby corrected as shown below:

Abstract

Line 2, is "shell having slots for ventilating"
   should be "shell having slots disposed therein for ventilating"

Line 5, is "depending skirt sized and contoured"
   should be "depending skirt extending therefrom sized and contoured"

Signed and Sealed this

Ninth Day of August, 1988

Attest:

DONALD J. QUIGG

Attesting Officer

Commissioner of Patents and Trademarks